Oct. 24, 1967     G. CARAMANNA     3,348,877
REMOVABLE CLOSURE FOR VEHICLE BODIES
Filed Jan. 14, 1966     2 Sheets-Sheet 1

INVENTOR.
George Caramanna
BY
W. S. Pettigrew
ATTORNEY

Oct. 24, 1967 G. CARAMANNA 3,348,877
REMOVABLE CLOSURE FOR VEHICLE BODIES
Filed Jan. 14, 1966 2 Sheets-Sheet 2

INVENTOR.
George Caramanna
BY
W.S. Pettigrew
ATTORNEY 3,348,877
REMOVABLE CLOSURE FOR VEHICLE BODIES
George Caramanna, Detroit, Mich., assignor to General Motors Corporation, Detroit, Mich., a corporation of Delaware
Filed Jan. 14, 1966, Ser. No. 520,579
3 Claims. (Cl. 296—137)

ABSTRACT OF THE DISCLOSURE

A removable top and side curtain unit for a convertible vehicle body includes a flexible cover of a size for covering the top and upper side portions of the passenger compartment, and a pair of resiliently deformable rigidifying frame structures secured within the forward and rearward marginal edge portions of the cover member for rigidly securing the top and side curtain unit to forward and rearward arch-shaped transverse headers of the vehicle body. The frame members are provided of normally undulate flat band springs operative to fold the cover member in accordion fashion. The frame members define two distinct side portions of the top and side curtain unit either side of transversely centrally located bayonet or like fastener fittings between the headers and the unit, each side portion being independently foldable and unfoldable relative to the body. Latches on the side curtain areas of the unit secure each cover side portion in unfolded position to the body.

---

One feature of this invention is that it provides a new and improved vehicle body closure arrangement adapted for quick, convenient and complete removal from the body when not in use. Another feature of this invention is that it provides a new and improved folding top and side curtain arrangement including a flexible cover member adapted to enclose the top and opposite upper side portions of an open vehicle body, and resilient rigidifying frame means unitary with the cover member and operable to normally locate the cover member in a compactly folded position for storage but being resiliently deformable to an unfolded or covering position wherein the cover member is caused to conform to adjacent rigid surfaces of the body for sealing engagement therewith and for pleasing appearance. Another feature of this invention is that the cover member and frame means unit includes two distinct portions independently foldable and unfoldable to open and close only respective portions of the vehicle body. Other features of the invention reside in the inclusion in the frame means of undulate flat springs or bands mounted in marginal edge portions of the cover member and foldable in accordion or pleating fashion, and latching means for holding the cover member in unfolded position against the action of the undulate bands.

These and other features and advantages of the invention will be readily apparent from the following specification and the drawings wherein.

Figures 1, 2:
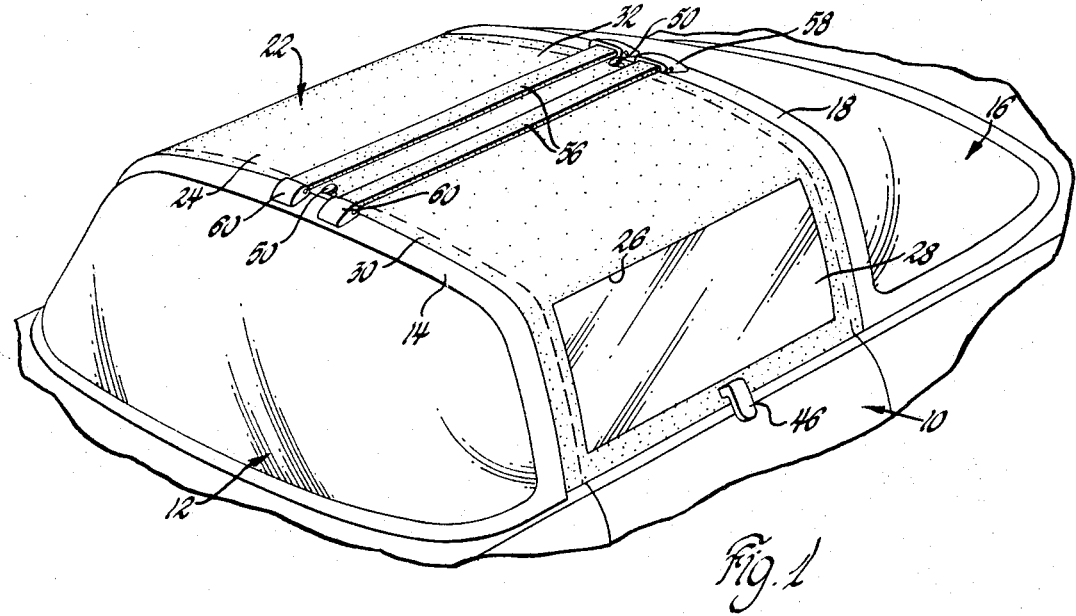
FIGURE 1 is a fragmentary perspective view of an open or convertible type vehicle body including a removable folding top and side curtain arrangement according to this invention shown in an installed and unfolded position.
FIGURE 2 is a view similar to FIGURE 1 showing a portion of the folding top and side curtain arrangement in an intermediate folded position.

Referring now particularly to FIGURE 1 of the drawings, the folding top and side curtain arrangement of the invention is shown in the environment of a low silhouette two passenger sports-type convertible vehicle body designated generally as 10. The body includes a generally conventional windshield and windshield supporting structure 12 including a header member 14 of a somewhat curved U-shaped profile in front elevation. Immediately rearward of the passenger area of the vehicle is provided a rear backlite and backlite supporting structure 16 including a header member 18 having a profile generally similar to that of header 14. Headers 14 and 18 are formed with shallowly indented exterior surfaces, as at 20, whereby to receive a folding top and side curtain arrangement according to the invention in such manner that it may lie flush with the uncovered portions of the headers and present a pleasing appearance.

The folding top and side curtain arrangement, designated generally as 22, includes a generally rectangular flexible cover member 24 sized to span headers 14 and 18 and to completely transversely enclose the top and upper side passenger compartment portions of the body. The cover includes opposite window cutouts 26 having plastic or other flexible window panels 28 secured thereto as by bonding, stitching or other suitable means.

Figure 4:
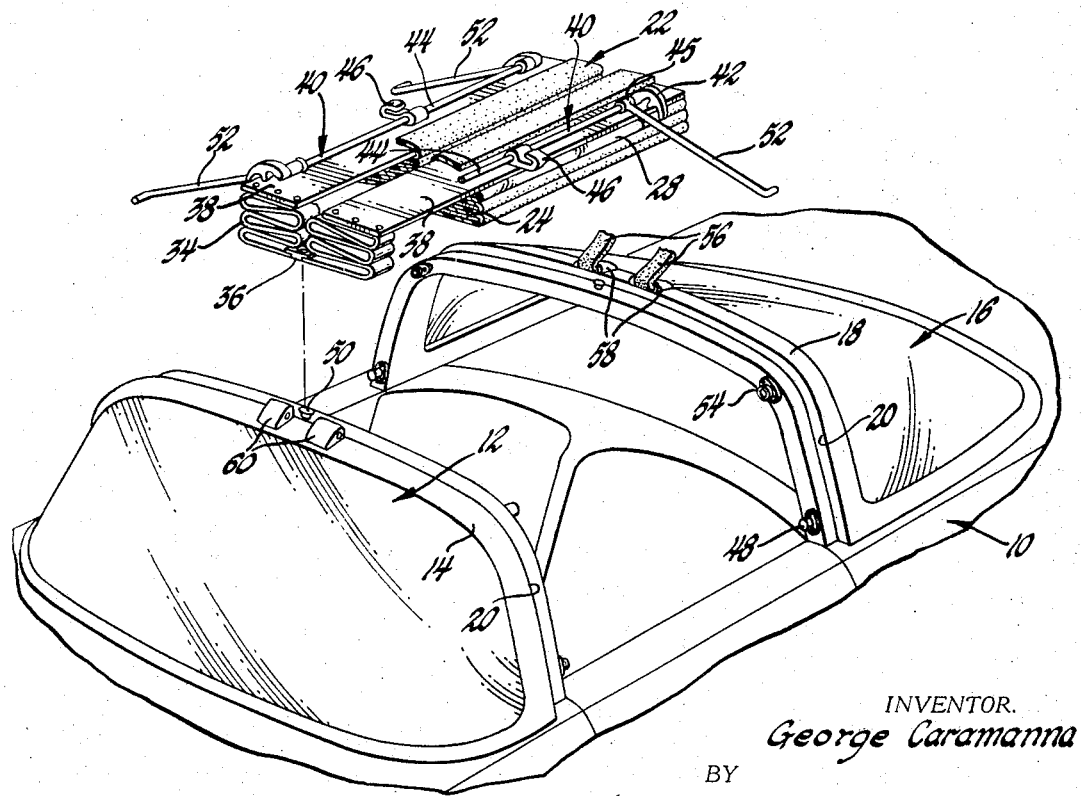
FIGURE 4 is a partially broken away view showing the folding top and side curtain arrangement completely folded and removed from the vehicle body.

The forward and rearward transverse edge portions 30 and 32 of cover 24 are provided with resilient cover retraction means operable to automatically fold the cover 24 from the unfolded position of FIGURE 1 to the folded position as indicated in FIGURE 4. As shown in the latter figure, the retraction means preferably take the form of normally undulate or convoluted flat bands 34 of spring steel or similar material. For each transverse edge portion 30 and 32 of the cover, two such bands may be provided whereby to define two independently foldable portions of top 22 respective to the two portions of the vehicle at either side of its centerline. The two bands 34 in each edge portion are interconnected by an anchor plate 36 of sufficient rigidity so as to provide for firm securement to the headers 14 and 18 as will be described. The other or free end of each band 34 has suitably secured thereto as by rivets or other means one end of one of two longitudinally extending side latch plates 38 each mounting a latch assembly 40. As shown best in FIGURE 2, each latch assembly includes a pair of hook bolts 42 fixed at opposite ends of a longitudinal rod 44 journaled at mounts 45 on plate 38. One portion of a release handle 46 on the rod is manipulable from inside the body when the top is unfolded to rotate the latch rod 44, while another portion of the handle extends through the latch plate 38 and cover 24 to be likewise manipulable from outside the body. Bolts 42 are latchably engageable in the unfolded position of the top with respective pin strikers 48 mounted on headers 14 and 18.

It is apparent that the four retraction bands 34 in the two edge portions 30 and 32, the interconnecting anchor plates 36, and the latch plates 38 together provide a substantially rigid frame for the cover 24. As indicated in FIGURES 1 and 4, the cover is secured over such frame by any suitable means such as the turning of edge flap portions of the cover over the various members of the frame and the stitching together of the cover layers thus defined.

Referring to FIGURES 1 and 4, the top is initially installed over body 10 through the provision on headers 14 and 18 of bayonet or similar fasteners 50 receivable through apertures in anchor plates 36 and cover 24 and turnable to a securing position thereover. Having secured fasteners 50, the two portions of top 22 are manually unfolded to deform or straighten bands 34 against the reaction of fasteners 50 and engage the bands over the contours of headers 14 and 18 within indentations 20. As shown in FIGURE 2, pairs of guide rods 52 respective to the latch plates 38 have one end of each rod fixed to the rotatable mount 45 and its other end insertable in a socket 54 mounted to header 14 or 18. These rods are of an appropriate length to swing about sockets 54 during manual pulling of the respective side portion of the top 22 to provide for guidance and leverage. In the fully unfolded position of the top, the rods coact with bolts 42 to hold the top against the retraction force of the bands 34 seeking their normal folded or convoluted position or state.

As shown in FIGURE 1, a pair of elastic straps 56 are extendible from rearward retainers 58 longitudinally over the central portion of the cover 24 to forward retainers 60 to prevent excessive ballooning of the cover in its unfolded position while the car is in motion. If desired, automatic retractor reels or similar means may be provided in the rearward retainer 58 to normally wind up the straps to a concealed position.

Figure 3:
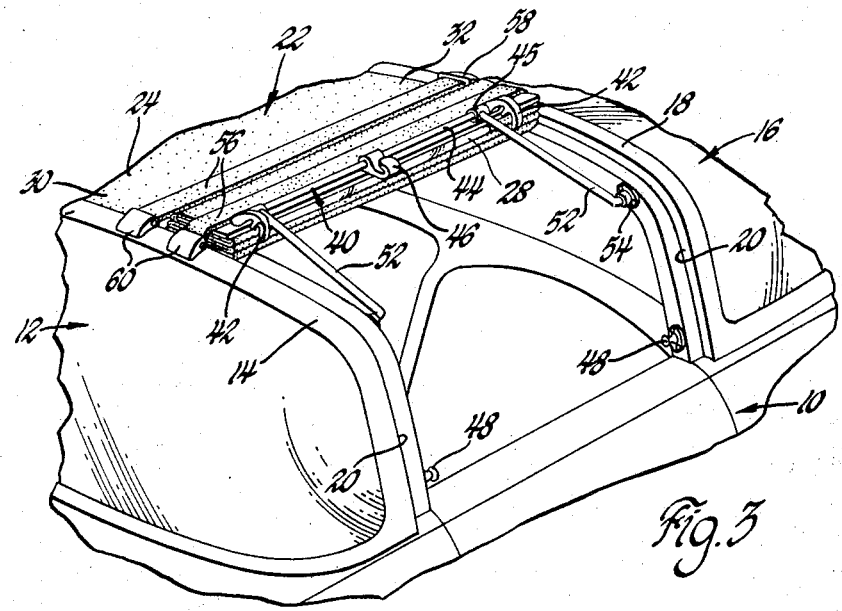
FIGURE 3 is a view similar to FIGURE 2 showing this same portion in a completely folded position.

Assuming now that it is desired to open up one side portion of the top unit for entrance or exit to or from the vehicle body or for other purposes, bolts 42 are released from the strikers 48 to allow the respective bands 34 for that side portion to retract cover 24 to a fully folded position as indicated in FIGURE 3. This top portion may then be inserted under the respective elastic strap 56 to hold the top portion in a flat compactly folded position.

If it is desired to completely remove the top 22 from the vehicle body, both side portions thereof are retracted toward their folded positions of FIGURE 3 as above-described, and the straps 56 are then removed from their extended position. Fasteners 50 are then released and the free ends of the rods 52 are removed from sockets 54. The top 22 is thus removable for compact storage in another part of the vehicle body or elsewhere, FIGURE 4.

It will be appreciated that the folding top and side curtain arrangement of this invention has particular utility in the type of vehicle body shown in that to enter or leave the vehicle body in a more or less standing or erect position, one or both side portions of the top need merely be transversely retracted to the position of FIGURE 3 rather than being completely removed. If it is desired to leave the side cover portion in such folded position, the bands 34 assure that the cover 24 assumes a neat compactly folded position under the straps 56.

It is further seen that the semirigid resilient bands 34 provide efficient and adaptable means for sealing the cover 24 with the headers 14 and 18 over a relatively broad area in that they readily assume the contours of the headers and avoid the need for precision fabrication of rigid frame members for exact parallelism with the headers. If desired, suitable seal strip means may be provided at edge portions 30 and 32 of the cover 24 to enhance such sealing engagement.

Having thus described my invention, what is claimed is:

1. In a vehicle body including a spaced pair of transverse header structures defining therebetween an opening to be covered, a removable top comprising, in combination, a flexible cover member of a size to cover said opening, said cover member including opposite transverse edge portions engageable with said spaced header structures, resiliently deformable rigidifying frame means including a plurality of undulate flat band spring members mounted to said edge portions as a unit with said cover member, said spring members defining a pair of distinct side portions of said cover member independently foldable and unfoldable to open and close respective portions of said opening, said spring members having a normal state folding said cover member side portions in accordion fashion to a storage position, means for releasably securing the cover member and spring members unit to said header structures, said spring members being yieldable to permit unfolding of said cover member side portions to positions covering said opening and sealingly engaging said edge portions with said header structures, and latching means respective to each of said cover member side portions for releasably holding said cover member side portions in covering position against the action of said spring members.

2. In a vehicle body including a spaced pair of transverse header structures defining therebetween an opening to be covered, a removable top comprising, in combination, a flexible cover member of a size to cover said opening, said cover member including opposite transverse edge portions respective to said spaced header structures, resiliently deformable rigidifying frame means having said cover member mounted thereto as a unit therewith, said frame means having a normal state folding said cover member and frame means unit to a folded storage condition, cooperative releasable securing means on said spaced header structures and on said cover member and frame means unit located generally transversely centrally of the body on each thereof and operative to secure said cover member and frame means unit to said spaced header structures, said cooperative securing means defining at each side thereof a distinct side portion of said cover member and frame means unit, each such side portion being independently foldable and unfoldable to open and close a respective portion of said opening, and latch means respective to each of said side portions for releasably holding said side portions in unfolded position against the action of said frame means.

3. A removable top according to claim 2 wherein said frame means include undulate flat band spring members operable to fold said cover member in accordion fashion.

References Cited

UNITED STATES PATENTS

| | | | |
|---|---|---|---|
| 2,375,925 | 5/1945 | Johnson et al. | 244—121 |
| 2,403,250 | 7/1946 | Verhagen | 244—121 |
| 3,001,212 | 9/1961 | Towne | 9—1 |

FOREIGN PATENTS

| | | |
|---|---|---|
| 839,840 | 4/1939 | France. |
| 831,063 | 6/1952 | Germany. |

LEO FRIAGLIA, *Primary Examiner.*

BENJAMIN HERSH, *Examiner.*

C. C. PARSONS, *Assistant Examiner.*